(No Model.) 3 Sheets—Sheet 1.
H. DAVEY.
PUMPING ENGINE.
No. 407,580. Patented July 23, 1889.
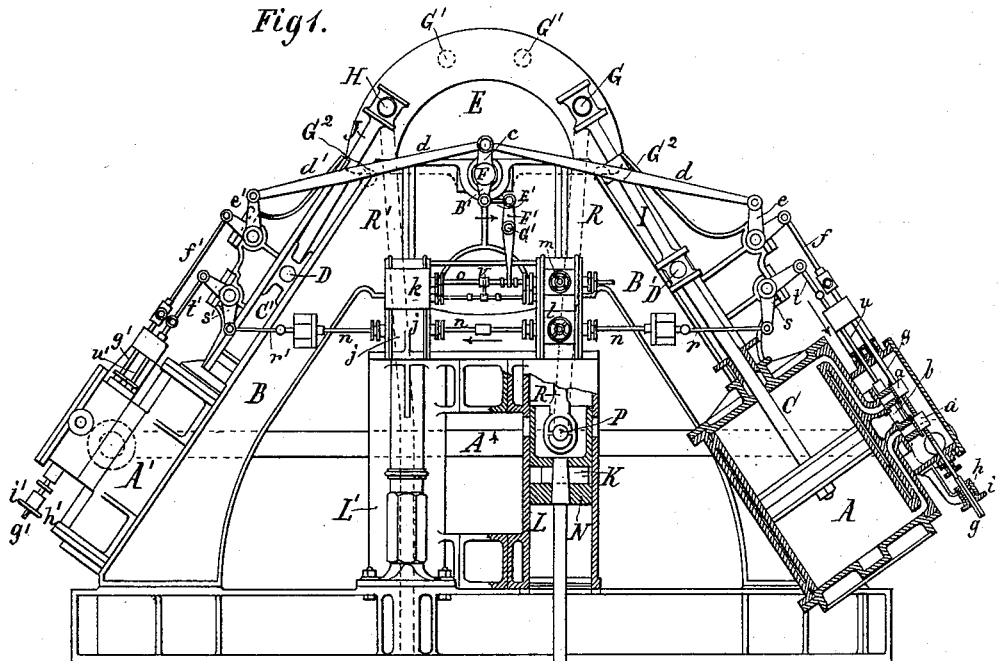
Fig. 1.
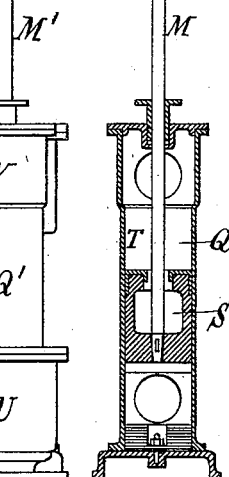
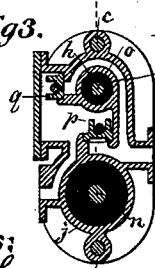
Fig. 3. Fig. 2.
Witnesses:
J. P. Theo. Lang.
Edward T. Fenwick
Inventor:
Henry Davey
by his atty
Mason, Fenwick & Lawrence (No Model.) 3 Sheets—Sheet 2.

H. DAVEY.
PUMPING ENGINE.

No. 407,580. Patented July 23, 1889.

Witnesses:
J. P. Theo. Lang
Edward T. Fenwick

Inventor:
Henry Davey
by his attys
Mason, Fenwick & Lawrence (No Model.)

3 Sheets—Sheet 3.

H. DAVEY.
PUMPING ENGINE.

No. 407,580.  Patented July 23, 1889.

Witnesses:
J. P. Theo. Lang.
Edward J. Fenwick

Inventor:
Henry Davey
by his atty
Mason, Fenwick & Lawrence

UNITED STATES PATENT OFFICE.

HENRY DAVEY, OF WESTMINSTER, COUNTY OF MIDDLESEX, ENGLAND.

PUMPING-ENGINE.

SPECIFICATION forming part of Letters Patent No. 407,580, dated July 23, 1889.

Application filed April 12, 1888. Renewed June 6, 1889. Serial No. 313,266. (No model.) Patented in England September 30, 1887, No. 13,270.

*To all whom it may concern:*

Be it known that I, HENRY DAVEY, a subject of the Queen of England, residing at No. 3 Princess Street, Westminster, in the county of Middlesex, Kingdom of Great Britain, have invented certain new and useful Improvements in Pumping-Engines, (for which I have obtained a patent in Great Britain, No. 13,270, bearing date September 30, 1887;) and I do hereby declare the following to be a full, clear, and exact description of the invention, such as will enable others skilled in the art to which it appertains to make and use the same.

This invention relates to improvements in steam pumping-engines, as will be hereinafter described and specifically claimed, by means of which expansive working of steam is better secured in the steam-cylinders.

Figure 4:
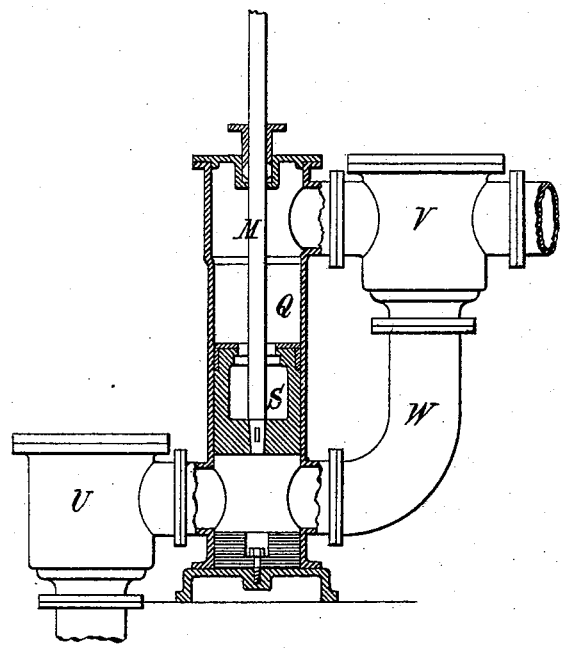
Figure 5:
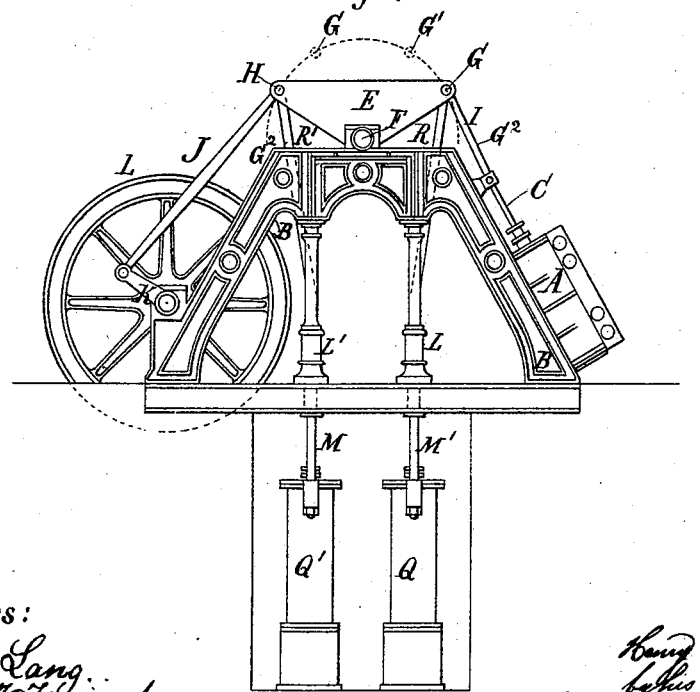
Figure 7:
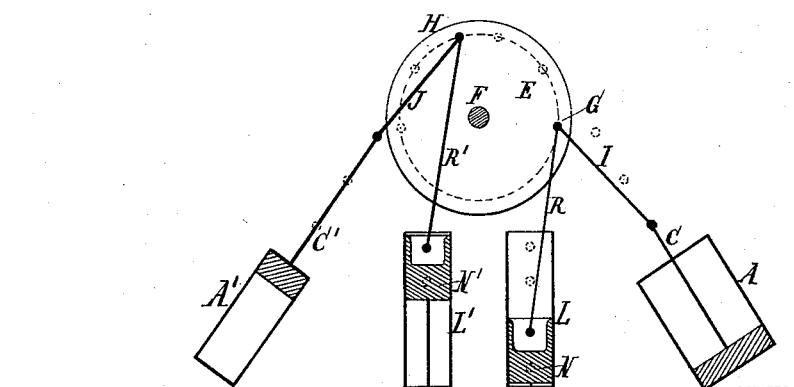
Figure 8:
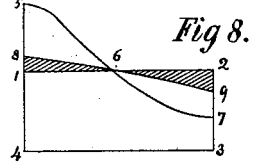
Figure 6:
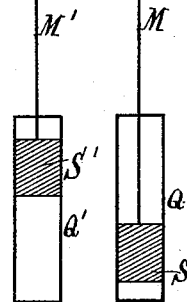
Figure 6:
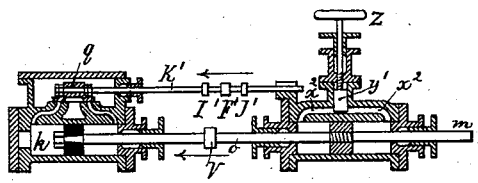

Figure 1 shows my invention applied to one style of engine, the view being partly in side elevation and partly in section. Fig. 2 is a section in the line $x\,x$ of Fig. 3 of the gear for operating the valves of the engine. Fig. 3 is a section of the same in the line $y\,y$ of Fig. 2. Fig. 4 is a detail of one of the pumps, the same being partly in section and partly in elevation. Fig. 5 illustrates the application of my invention to another style of engine, same being provided with a fly or balance wheel. Fig. 6 is a section in the line $x\,x$ of Fig. 2. Fig. 7 is a diagrammatical view illustrating my invention, and Fig. 8 a resultant indicator-diagram.

A A' are the cylinders of a steam pumping-engine secured to the engine-frame B. The cylinder A' and its mechanism are operated by high-pressure steam, and cylinder A and its mechanism are operated by low-pressure steam. These cylinders are connected by an exhaust-pipe $A^4$. The relative proportions of the cylinders A and A' are clearly shown in diagram, Fig. 7.

C C' are the piston-rods of the cylinders, attached to the cross-heads D D', which cross-heads are provided with slide-blocks working in the slides cast upon the engine-frame B.

E is a rocking frame fulcrumed at F, and provided with pins G and H, which are respectively connected to the cross-heads D D' by means of the connecting-rods I and J.

M M' are pump-rods attached to the pistons S S' of the lift-pumps Q Q'. The pistons S S' are fastened to the pump-rods M M' and work in the barrels T T' of the pumps Q Q', as shown. U indicates one of the suction-valve boxes, and V one of the delivery-valve boxes. On the downward stroke the pistons S S' merely displace the water, transferring it from below to above through the pipes W and the delivery-valve boxes, as V; but on the upstroke they raise the water through the main and at the same time draw the water through the valve-boxes, as U. Thus the working of the pumps is done on the upstroke only and the downstroke is an idle one. The rods M M' are secured at their upper extremities by means of the colters, as K, to cross-heads, as N, working in the guides L L'. In the cross-heads N are pins, as P, which are connected to the pins G and H on the rocking frame E by means of the rods R R'. When the pistons of the engine are at mid-stroke, a line drawn through the center of the pin G and the fulcrum F will be at right angles to the center line of the cylinder, and the variation from this angle will be the same for the two extreme positions G' and $G^2$; but the angle which the rod R makes with the line intersecting G and F becomes more and more acute as the said line moves from the position $G^2$ to G'. By this means the lifting-stroke is made with increasing effect upon either one or the other sides of the machine, while the idle stroke is being made on either one or the other side.

As the resistance to the pistons of lifting-pumps is constant and the force by which they are operated varies by reason of the above-described varying leverage, steam may be employed expansively in operating the steam-pistons.

$a\,a'$ are the steam-valves of the cylinders A A', and $b$ one of the two exhaust-valves provided upon the same. The valves, as $a\,a'$, receive their motion from the engine by means of the lever-arm $c$, which is keyed upon the shaft F and connected to the valves, as $a\,a'$, on each side of the machine by means of the connecting-rods $d\,d'$, the angular levers $e\,e'$, the connecting-rods $f\,f'$, and the valve-rods $g\,g'$. The respective valve-rods $g\,g'$ are fitted to the respective pairs of valves $a\,a'$ by right and left handed screw-threads and can turn in the valves $a\ a'$. The right-hand portion of the thread for one valve runs in one direction, and the left-hand portion for the other valve in a reverse direction, and the pitch of both is the same, thus insuring a simultaneous and uniform adjustment of the respective pairs of valves by the respective valve-rods when they are turned. The lower ends of the valve-rods $g\ g'$ are made square where they work in the sockets $h\ h'$ of the hand-wheels $i\ i'$, so that upon turning the said hand-wheels the valve-rods $g\ g'$ are turned with them, and thus the valves $a\ a'$ may be moved nearer together or farther apart, according to the direction in which the hand-wheels $i\ i'$ are turned, and by this means the cut-off of steam may be varied.

The exhaust-valves, as $b$, receive their motion from the gear, shown in section in Figs. 2 and 3, of which $j$ and $k$ are subsidiary steam-cylinders, the pistons of which are respectively attached to the pistons of the cataract-cylinders $l$ and $m$ by means of the rods $n$ and $o$. The steam is distributed in the cylinders $j$ and $k$ by means of the D-shaped slide-valves $p$ and $q$, the valve $p$ being actuated by an arm on the piston-rod $o$, and the valve $q$ receiving the engine motion in any convenient way. The cataract-cylinders $l$ and $m$ are filled with water or other fluid, and each is provided with a passage leading from one end of the cylinder to the other, the speed of the water through this passage being regulated by means of a plug. This regulator is illustrated in Fig. 6, where $x^2\ x^2$ is the passage leading from one end of the cylinder to the other; $y'$, the plug, by means of which the said passage may be throttled, and $z$ the hand-wheel for screwing the said plug in or out. The piston-rod $n$ of the subsidiary piston of cylinder $j$ is connected to the exhaust-valves, as $b$, of the engine-cylinders A A' by means of the rods $r\ r'$, the bent levers $s\ s'$, the connecting-rods $t\ t'$, and the valve-rods $u\ u'$. As the piston of cylinder A reaches the end of its upstroke, the lever B', fulcrumed at F and connected by means of the rod E' to the lever F', fulcrumed at G', causes the said lever F' to strike the tappet I' on the rod K', which moves the D-shaped slide-valve $q$, Fig. 8, in the direction of the arrow, thus opening the inner steam-port of the subsidiary cylinder $k$ and causing the piston of the said cylinder to move in the same direction as that in which the valve $q$ was moved. The motion of the piston of cylinder $k$ will cause it to push the slide-valve $p$ the proper distance by means of the arm V, attached to its piston-rod $o$, and steam will thus be admitted into the inner end of the cylinder $j$, and the piston of the said cylinder will move in the same direction as that in which the piston of the cylinder $k$ is moving, and will, through the connections already described, move the engine-valve $b$ in the direction of the arrow, thus admitting steam into the upper end of the cylinder A.

The piston of the said cylinder will now move in the same direction as the valve $b$ is being moved, and will, through the connections previously described, carry with it the expansion-valves $a\ a'$. The motion of the exhaust-valve $b$ is rendered constant by reason of the adjustment by the cataract $l$, while the motion of the expansion-valves $a\ a'$ on the back of the exhaust-valve $b$ is concurrent with that of the main piston A. If, therefore, the speed of the engine increases, the cut-off of steam will be effected earlier in the stroke, because the expansion-valves $a\ a'$ will, by means of the regulating motion of the cataract $l$ and rod $n$, be caused to overtake the exhaust-valve $b$ sooner than when the engine is running at its normal speed.

The operation is the same as just described whether either the parts of cylinder A or A' are regarded as performing the movements mentioned.

In Fig. 5 the piston of the cylinder A is connected with the pin G of the rocking frame E in the same way as in Fig. 1; but the pin H of the said rocking frame is connected by means of the rod J to the crank K, upon the shaft of which is keyed the fly-wheel. In this construction the piston-rod C of piston in cylinder A is connected to the pin G of the rocking frame E, and the piston-rods M M' of the pistons S S' of pump-cylinders Q Q' are connected to the pins G and H of said rocking frame, and thus the advantages of the varying leverage produced by the rocking frame E are secured, and in this feature of construction the invention shown in Fig. 5 is equivalent to an analogous feature of construction shown in Fig. 1. In both illustrations the connecting-rods I and R are acted directly upon by the pin G, while the connecting-rods R' and J are acted upon directly by the pin H, and the desired motions of the piston of rod C and of the pistons of rods M and M', and the crank K of rod J, and fly-wheel L, regulated by the rocking frame E, are insured. The valves of this engine may be worked by the Corliss valve-gear, or by any other valve-gear applicable to rotative engines provided with a crank-shaft and fly-wheel.

In the diagram Fig. 7 the relative proportions of the two steam-cylinders A A' with one another and the pump-cylinders are shown. A' in this diagram represents the high-pressure and A the low-pressure cylinder.

In the resultant-indicator diagram Fig. 8 1 2 3 4 gives the resultant of the pumps, 3 4 5 6 7 gives the resultant of the combined engine, and 3 4 8 6 9 12 13 14 gives the resultant of the engine mechanism. In this diagram 1 8 6 indicate power absorbed by inertia of parts, and 2 6 9 the power given out by momentum of parts.

In my improved compound differential engine herein described several important advantages are secured. By the peculiar mode of attaching the engine to the pumps the resistance which the pump imposes on the engine is made to diminish as the piston proceeds on its stroke, enabling higher degrees of expansion to be employed. The pumps Q Q′ lift the water on the upstroke only, the downstroke being idle. At the beginning of the upstroke the velocity of the pump-piston is relative to the engine-piston about two and one-half times as great as it is at the end of the stroke. The resistance due to variation of velocity is therefore about two and one-half times less at the end. The actual decrease of resistance is more than that, (it may be six to ten times,) depending on the weight and inertia of the moving parts of the engine and pump. The value of inertia, determined by variation of velocity of the moving parts, may be adjusted to suit the actual conditions of pressure and cut-off. The governing action of the differential valve-gear automatically makes that adjustment, so that the ratio of expansion may be varied within very wide limits without affecting the smooth working of the engine. The providing of each engine-cylinder with separate expansion-valves adjustable by hand and automatically controlled by the action of the gear renders the pumping-engine very convenient, while it is effective in its operation.

What I claim is—

1. In a pumping-engine, the combination of the rocking frame E, having pins G H and a fulcrum F, pumps Q and Q′, connecting-rods R I, both pivoted directly to pin G of frame E, and connecting-rods R′ and J, both pivoted directly to pin G of frame E, the respective pairs of said connecting-rods forming acute angles at any position of the pins G and H, substantially as and for the purpose described.

2. In a pumping-engine, the combination of the rocking frame E, fulcrumed at F and having pins G and H, and the piston-rods C and C′, of steam expansion working-cylinders A A′, the adjustable steam expansion-valves $a$ $a'$, valve-gearing comprising arm $c$, rods $d$ $d'$, angular levers $e$ $e'$, connecting valve-rods $f$ $f'$, adjusting valve-rods $g$ $g'$, valves, as $b$, and the pump piston-rods M M′, with their pistons S S′, substantially as described.

3. The combination of the valves $p$ $q$, the cylinders $j$ $k$, rods $n$ and $o$, with their pistons, the cataract-cylinders $l$ $m$, with their pistons, the rods $r$ $r'$, angular levers $s$ $s'$, connecting-rods $t$ $t'$, valve-rods $u$ $u'$, valves, as $b$, and the expansion-valves, as $a$ $a'$, substantially as described.

4. The combination, with the steam pumping-engine working steam expansively and with the pumps, of the cataract-regulator comprising subsidiary steam-cylinders, as $j$ $k$, pistons on rods, as $n$ and $o$, cataract-cylinders, as $l$ $m$, and intermediate connections for the valves of the said engine, substantially as and for the purpose described.

In testimony whereof I hereunto affix my signature in presence of two witnesses.

HENRY DAVEY.

Witnesses:
JOHN JOURBEL,
A. R. C. RIDGWAY.